Dec. 9, 1947.   G. GIRARD   2,432,234
MAGNETIC CLUTCH
Filed March 8, 1944

INVENTOR
GEORGES GIRARD,
BY
Hohaupter & Groff
HIS ATTORNEYS

Patented Dec. 9, 1947

2,432,234

UNITED STATES PATENT OFFICE 2,432,234

MAGNETIC CLUTCH

Georges Girard, Geneva, Switzerland, assignor to Magnetos Lucifer S. A., Geneva, Switzerland, a corporation of Switzerland Application March 8, 1944, Serial No. 525,624
In Switzerland June 2, 1943

7 Claims. (Cl. 172—284)

The present invention relates to magnetic clutches. More particularly, it relates to magnetic clutches used chiefly for driving measuring apparatus, such as speed-indicators, water- or steam-meters, water-level indicators, electrostatic voltmeters, cathode-oscillographs and other apparatus and machines in which the measuring element, or generally speaking, the driving element, is preferably completely separated mechanically from the organs which it must drive.

The different apparatus may be separated into two classes for which the conditions of functioning are different and for which the requirements which the magnetic clutches must fulfill are therefore also different.

a. Integrating instruments.
b. Indicating instruments.

a. Integrating instruments

In this type of apparatus, the measuring element generally drives a counter. In this case (assume it is a water meter for the purposes of illustration) the measuring element consists generally of a rotating device placed for example in a pipe, such as a vane or the like, the rotating speed of this device being proportional to the speed of flow of the fluid by which it is driven. This rotating device drives for example a counting mechanism which sums up its number of revolutions and which indicates the volume of the fluid which has passed through the pipe.

The clutches, known up to this day and employed with these apparatus, consist generally of a driving and a driven part arranged co-axially, one of these parts being constituted of a permanent magnet and the other part consisting of a ferro-magnetic element. The driving part is generally separated from the driven part by means of a para-magnetic cup. Each the driving and the driven element carry an even number of poles; the poles of each pair being placed on a same diameter and different pairs of poles being arranged symmetrically with respect to their axis of rotation.

These clutches do not give entire satisfaction, because in the case of water-hammers or sudden increase of flow, the acceleration of the measuring element becomes very great. It is for this reason, that the opposing torque, due to the inertia of the parts to be accelerated, increases suddenly and may become larger than the torque, which the magnetic clutch is capable of transmitting. It may therefore result, that the driven part does not follow the driving element. The driven element may therefore suffer a delay of several revolutions with respect to the driving element and may, in certain cases, even stop revolving. The angular displacement (slip) permissible between the driving and the driven element to ensure the transmission of torque being relatively small, the driving element thus stopped is not capable of accelerating the driven element sufficiently, from this stopped position so as to cause it to follow the rotating motion without lag or delay. As a result therefore and in order to restore the functioning of the apparatus in the case of the driven element being stopped, it may be necessary to stop the driving element, to then let it resume its rotating movement while taking care that its speed increases gradually. This will permit a progressive acceleration of the driven element without risk of its motion lagging too much behind the driving element.

b. Indicating instruments

In such instruments, the measuring element generally drives an index or pointer. In the case of a level or pressure indicator for example, the measuring element, for example, a float, rises or sinks with the manometric level of the liquid. In order that the pointer really indicates the position of the float, it is necessary that the total possible displacement of the latter corresponds to a maximum angular displacement of the clutch device. Furthermore the relative positions between the driving and the driven elements must be well determined in such a manner that there exists only one position of the driven element for the corresponding position of the driving element. With this in mind, certain designers have constructed clutches consisting of driving and driven parts equipped with poles arranged asymmetrically with respect to the axis of rotation, but arranged similarly on each of the two parts. As a result thereof there exists only one stable position between the driven and the driving part, namely, the position in which the pole-faces of the two parts are opposite to each other. For this position the reluctance has a maximum value, that is to say, the magnetic resistance of the magnetic circuit is a minimum. These clutches may evidently also be used for driving integrating apparatus, but they show, in these cases, the same disadvantages as the clutches described above; these disadvantages are furthermore aggravated due to the fact that there exists only one stable position between the driving and the driven part.

The object of the present invention is to provide a magnetic clutch consisting of a driving part and a driven part, these parts being arranged co-axially, at least one of these parts being constituted of a permanent magnet. This clutch differs from known clutches in as much as the driving and the driven parts carry each an even number of poles, the angular distances between the unlike poles of a pair of poles being different for the driven and the driving parts.

The attached drawing shows schematically different forms of invention of a magnetic clutch according to this invention.

Figure 1:
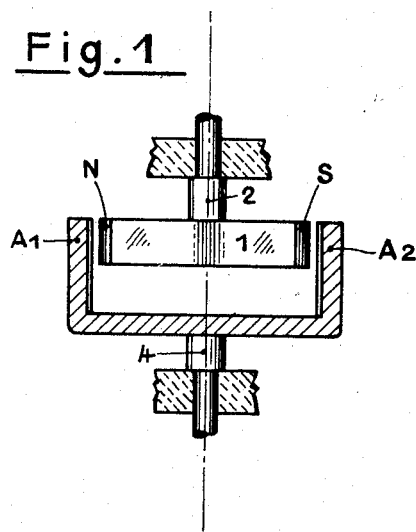
Figure 1 shows a view of a clutch, the driving and driven parts of which each consist of one pair of poles only.
Figure 4:
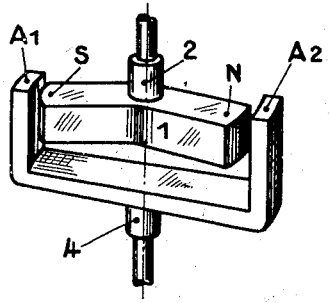
Figure 4 shows a perspective view of a clutch as per Fig. 1.

In principle, the clutch is constituted of a driving part and a driven part, these two parts being arranged co-axially one to the other. One of these parts consists of a permanent magnet where as the other part is made of a C-shaped profile of soft iron or any other ferro-magnetic material. The two legs of the C-shaped profile constitute the poles of this latter part.

In the forms of invention shown on the drawing, the driven part consists of a permanent magnet 1 having two poles N, S, this magnet being fastened to a shaft 2; the driving part shows one pair of poles $A_1$, $A_2$ (Fig. 2) or two pairs of poles $A_1$, $A_2$, $B_1$, $B_2$ (Fig. 3) of a ferro-magnetic material, these poles being fastened on the axis 4.

The poles of the same pair of the driving part are arranged on the same diameter, the angular separation being therefore 180°. The angular distance or separation between the poles of the driven part is approximately 140° to 160°, but is always smaller than 180°, thus, a V-shaped driven element is provided. It is quite evident, that any number of pairs of poles may be provided on the driving part as well as on the driven part and that the permanent magnet may be carried by either of these two parts; one may also provide one or several permanent magnets on each of driven or driving parts. At any rate however, the angular separation on the angular distance between the poles of a pair of poles of the driving part is always different from the angular separation between the poles of a pair of the driven part.

As shown on the drawing and in order to obtain stable positions of the driven part with respect to the driving part, it is advantageous to arrange the pole-faces of the driving and the driven parts in such a manner, that two poles of the driving part are at least partially face to face with two poles of the driven part. In other words, it is advantageous that the difference between $a$ and $b$ be smaller than the sum of the angular lengths $e$ and $c$ of the pole faces of the two poles being in a face to face position.

The advantage of the present clutch with respect to other known clutches consists in the fact that the permissible angular displacement (slip) between the driving and the driven parts is very large before any falling out of step occurs.

With respect to known designs of magnetic clutches it is a known fact, that with the poles of the driving and the driven parts being all arranged symmetrically to the axis of rotation of the device, that is to say with the angles $a$ and $b$ being equal, the driving torque has a maximum value at the instant when the pole-faces of the driving part are about to leave the face-to-face position with the corresponding poles of the driven part. As a fact, with the respective poles of the driving and the driven parts being face to face, the magnetic resistance of the magnetic circuit has attained a minimum value, the induction in the air-gaps being a maximum. These relative positions of the poles are the stable positions. The maximum torque is therefore obtained as soon as the angular displacement between the driving and the driven parts is greater than the angular length of the pole-faces, that is as soon as the air-gaps and with them the magnetic resistance increases. The driving torque decreases very rapidly with increasing angular displacements between the driving and the driven parts, the two air-gaps increasing very rapidly and the induction decreasing at a fast rate. Thus for a relatively small angular displacement between the poles of the driving and the driven parts, the driving torque may already be smaller than the resisting torque acting upon the driven part.

Figure 2:
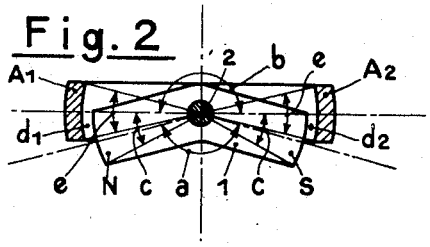
Figure 2 shows a plan view of the same invention.
Figure 3:
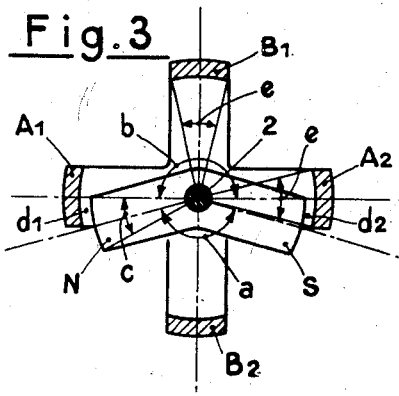
Figure 3 shows a plan-view of a magnetic clutch, one part of which consists of one pair of poles whereas the other part is constituted of two pairs of poles.

Referring first to Figure 2 of the drawing; in the clutch according to this invention, the angular distances $a$ and $b$ being different, even a very small angular displacement of the driving part, starting from the stable position (position shown) for which the magnetic resistance of the circuit is a minimum, causes immediately an increase of one only of the air-gaps whereas the section of the other increases as one pair of unlike poles of the driven and driving parts come opposite each other. If for example the driven part is maintained in a fixed position and the driving part turns in a counter-clockwise direction, $d_1$ increases, $d_2$ remains constant whereas its section increases.

As a result therefrom the magnetic resistance of the circuit at first increases at a relatively small rate only as a function of the slip, in such a manner that the induction in the air-gap $d_1$ remains high even for a relatively big slip. As a consequence, the force acting between pole N and pole $A_1$ of the driving part, tends to turn back the driven part towards its stable position, and remains approximately constant until the pole S of the driven part arrives face to face with pole $A_2$ of the driving part.

Starting from this position, the section of the second air-gap $d_2$ decrease again, so that the magnetic resistance increases at a faster rate than before. Referring to Figure 2 of the drawing, for example, at the instant the two poles S and $A_2$ separate from a constant or face to face position, and the angular displacement of the two poles attains the value of $$\frac{(b-a)+(e+c)}{2}$$

wherein $a$ and $b$ are the unequal angles of rotation and $e$ and $c$ are the angular lengths of the pole faces of the two poles for their respective face to face positions; then the second air gap $d_2$ also increases. At this instant, the force acting upon the second pole S of the driven part attains a maximum value and has the same direction as the force acting upon pole N. As a result thereof the total torque tending to turn back the driven part into its stable position reaches a maximum there and then. Starting from this position, the torque decreases progressively.

Figure 5:
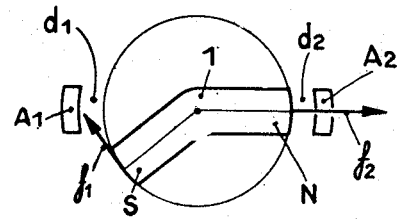
Figure 5 shows a sketch illustrating the functioning of the clutch.

In addition to these favorable magnetic characteristics, it is to be noted in the case of a relatively great slip between the two parts (such as the two poles N and $A_2$ being face to face, Fig. 5), the magnetic force $f_1$ attracting pole S towards $A_1$ acts approximately in the direction of the tangent of the circle upon which is located pole N. This is of great importance because of the fact that in practical cases it is often necessary to provide a separation of paramagnetic material between the driving and the driven part, the two air-gaps $d_1$ and $d_2$ being therefore relatively great. In known clutches, as a consequence thereof, the force acting upon the poles decreases very rapidly as a function of the slip, the tangential component of this force never attaining but a small proportion of this force. Therefore the driving couple remains always small. In the clutch described, however, the force acting upon one of the poles decreases but little as a function of the slip, the tangential component of this force attaining therefore a value nearly equal to said force. As a result thereof, the torque acting upon the driven part remains constant as a function of the slip or may even increase in some cases, until this slip becoming greater than $$\frac{(b-a)+(e+c)}{2}$$

From the foregoing there results the fact that a clutch according to this invention permits of obtaining appreciable torque over a great angular distance, thus permitting a considerable slip between the driving and the driven parts without risk of falling out of step. Should the driven part fall out of step as a result of the sudden increase of the resisting torque and tend to come to a standstill, it will, due to this particularity, again "fall in step" as soon as the resisting torque reaches its normal value again.

Due to this particularity, this clutch may be used as an elastic connection, permitting the transmission of a motion (rotation) with an approximately constant torque. Two different cases may present themselves:

1. The speed of the driving part is constant and the resisting pair of poles is variable. In such case the driving part turns synchronistically with the driven part up to a value limit given by the resisting pair of poles. For values greater than the resisting pair of poles, the ratio between the rotation speed of the driving part and that of the driven part is a function of the resisting pair of poles.

2. The speed of the driving part is variable and the resisting pair of poles is constant. In this case the driven part turns synchronistically with the driving part up to a value limit given by the speed of the latter. For increased speeds of the driving part the speed of the driven part remains approximately constant.

In the attached drawing of the clutch according to this invention, only the parts essential for the comprehension of its functioning are shown schematically. It is evident that in the case of a practical design, each part of the clutch is dynamically balanced with respect to its axis of rotation by adding inert masses of non-magnetic material. This is of course particularly necessary for that part of the clutch which is equipped with poles arranged in an asymmetrical manner with respect to the axis of rotation.

What is claimed is:

1. A magnetic clutch consisting of a driving part and a driven part pivoted coaxially, at least one of said parts being constituted of a permanent magnet, said driving and driven parts comprising pairs of like and unlike poles, like and unlike poles of the same pair of said driving part being arranged about a circular path on the same diameter so as to be opposite each other, said driven part comprising a V-shaped member having like and unlike poles, and said driving part comprising a cup radially spaced from said driven part to provide air gaps, said cup having wall sections which define the said like and unlike poles opposite to each other, whereby one air gap between one pole of the pair of poles of said driven part and one pole of a pair of poles of said driving part is always wider than the other when one of the said poles of a pair of said parts are in close proximity to each other.

2. A magnetic clutch consisting of a rotating driving member and a rotatable driven member, said two members being pivoted coaxially and equipped with a rotor each made of ferro-magnetic material, each rotor having an even number of circumferentially distributed pole-pieces, at least one of said rotors being magnetized to produce a permanent pole in each of its pole-pieces, a north pole alternating with a south pole, said driven member being driven magnetically by said driving member, one of said two rotors having its pole-pieces spaced angularly in an even manner around its pivot and being angularly symmetrical while the other rotor having its pole-pieces spaced angularly in an uneven manner is angularly non-symmetrical, the angular distance between the two pole piece axes at least in said angularly non-symmetrical rotor being different from the angular distance between any two pole-piece axes on said angularly symmetrical rotor, so that the pole-piece axes of one rotor are constantly out of line with the pole-piece axes of the other rotor.

3. A magnetic clutch as claimed in claim 2, wherein said angularly non-symmetrical rotor has two pole-pieces.

4. A magnetic clutch as claimed in claim 2, wherein said angularly non-symmetrical rotor has two pole-pieces, the angular distance separating the least distant edges located one on each of two diametrically opposite pole-pieces of said angularly symmetrical rotor being less than the angular distance separating the farthest distant edges located one on each of the two pole-pieces of said angularly non-symmetrical rotor.

5. A magnetic clutch as claimed in claim 2, wherein said angularly non-symmetrical rotor has two pole-pieces, and said angularly symmetrical rotor has four pole-pieces.

6. A magnetic clutch as claimed in claim 2, wherein said non-symmetrical rotor is a permanent two pole magnet, said angularly symmetrical rotor having four unmagnetized pole-pieces, the angular distance separating the least distant edges located one on each of two diametrically opposite pole-pieces of said angularly symmetrical rotor being less than the angular distance separating the farthest distant edges located one on each of said two poles of said permanent magnet, the angular spacing of the axes of the magnet poles being different from 90°, so that during operation both pole axes of one rotor are constantly out of line with the pole-piece axes of the four pole-piece rotor.

7. A magnetic clutch consisting of a rotating driving member and a rotatable driven member, said two members being pivoted coaxially and equipped with a rotor each made of ferro-magnetic material, each rotor having two circumferentially distributed pole-pieces, one of said rotors being a permanent two pole magnet with a north pole and a south pole, the other rotor having two unmagnetized pole-pieces, said driven member being driven magnetically by said driving member in which said permanent magnet having its poles spaced angularly in an uneven manner around its pivot is angularly non-symmetrical, said other rotor having its two pole-pieces diametrically opposite to each other being angularly symmetrical, the angular distance separating the least distant edges located one on each of the two pole-pieces of said angularly symmetrical rotor being less than the angular distance separating the farthest distant edges located one on each of said two poles of said permanent magnet.

GEORGES GIRARD.

REFERENCES CITED

The following references are of record in the file of this patent:

UNITED STATES PATENTS

| Number | Name | Date |
| --- | --- | --- |
| 1,311,922 | Slater | Aug. 5, 1919 |
| 1,696,132 | Wermeille | Dec. 18, 1928 |
| 2,127,847 | Schulte | Aug. 23, 1938 |
| 2,255,420 | Graham | Sept. 9, 1941 |

FOREIGN PATENTS

| Number | Country | Date |
| --- | --- | --- |
| 373,380 | Italy | July 25, 1939 |
| 636,699 | Germany | Oct. 13, 1936 |